(12) United States Patent
Shimizu

(10) Patent No.: US 12,199,312 B2
(45) Date of Patent: Jan. 14, 2025

(54) BATTERY AND MANUFACTURING METHOD FOR BATTERY

(71) Applicant: Panasonic Intellectual Property Management Co., Ltd., Osaka (JP)

(72) Inventor: Kazumichi Shimizu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 623 days.

(21) Appl. No.: 17/438,514

(22) PCT Filed: Mar. 17, 2020

(86) PCT No.: PCT/JP2020/011718
§ 371 (c)(1),
(2) Date: Sep. 13, 2021

(87) PCT Pub. No.: WO2020/196094
PCT Pub. Date: Oct. 1, 2020

(65) Prior Publication Data
US 2022/0131240 A1    Apr. 28, 2022

(30) Foreign Application Priority Data
Mar. 28, 2019 (JP) ................. 2019-064950

(51) Int. Cl.
*H01M 50/536* (2021.01)
*H01M 50/107* (2021.01)
*H01M 50/533* (2021.01)

(52) U.S. Cl.
CPC ....... *H01M 50/536* (2021.01); *H01M 50/107* (2021.01); *H01M 50/533* (2021.01)

(58) Field of Classification Search
None
See application file for complete search history.

(56) References Cited

U.S. PATENT DOCUMENTS

| 2006/0024571 A1 | 2/2006 | Kim et al. |
| 2010/0247992 A1 | 9/2010 | Miyata et al. |
| 2017/0069901 A1 | 3/2017 | Haraguchi et al. |

FOREIGN PATENT DOCUMENTS

| CN | 101952997 A | 1/2011 |
| JP | 2006-012787 | 1/2006 |

(Continued)

OTHER PUBLICATIONS

International Search Report of PCT application No. PCT/JP2020/011718 dated Jun. 9, 2020.

(Continued)

*Primary Examiner* — Lucas J. O'Donnell
(74) *Attorney, Agent, or Firm* — Rimon P.C.

(57) ABSTRACT

A method for manufacturing a battery, includes: preparing a case having an opening at one end portion of the case and a bottom portion at another end portion of the case; preparing an electrode group including a first electrode, a second electrode, and a current collecting lead electrically connected to the first electrode; housing the electrode group in the case; and joining the current collecting lead to an inner surface of the case. The joining of the current collecting lead includes: pressing a pressing device having a tubular shape against the current collecting lead to cause the current collecting lead to contact the inner surface of the case; and welding the current collecting lead to the case while an inside of a tube of the pressing device is sucked by a suction device.

8 Claims, 6 Drawing Sheets

(56) References Cited

FOREIGN PATENT DOCUMENTS

| | | |
|---|---|---|
| JP | 2009-238604 | 10/2009 |
| JP | 2011-228153 | 11/2011 |
| JP | 2015-162270 | 9/2015 |
| JP | 2015-162326 | 9/2015 |
| KR | 10-2018-070347 A | 6/2018 |
| WO | 2010/016182 | 2/2010 |

OTHER PUBLICATIONS

English Translation of Chinese Search Report dated Oct. 28, 2023 for the related Chinese Patent Application No. 202080009370.5.

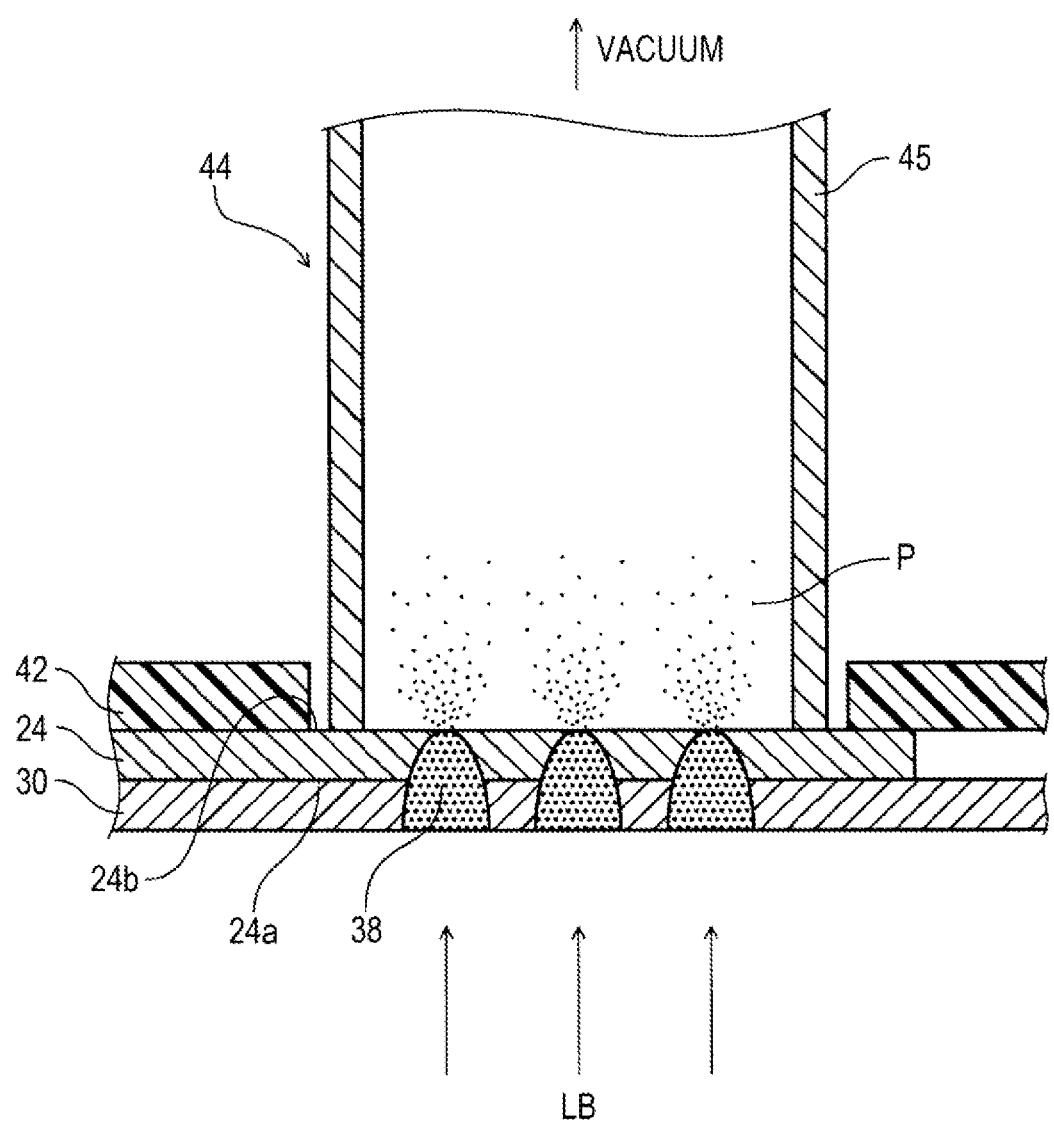

BATTERY AND MANUFACTURING METHOD FOR BATTERY

CROSS-REFERENCE TO RELATED APPLICATIONS

This application is a U.S. national stage application of the PCT International Application No. PCT/JP2020/011718 filed on Mar. 17, 2020, which claims the benefit of foreign priority of Japanese patent application No. 2019-064950 filed on Mar. 28, 2019, the contents all of which are incorporated herein by reference.

TECHNICAL FIELD

The present disclosure relates to a battery and a method for manufacturing the battery, and more particularly to a battery configured to electrically connect a current collecting lead of a current collector to a case by welding, and to a method for manufacturing the battery.

BACKGROUND ART

PTL 1 discloses a manufacturing method of performing laser welding by inserting a center pin into a center portion of an electrode assembly and pressing a current collecting tab (positive electrode tab or negative electrode tab) against a bottom surface of the case, and irradiating the current collecting tab with a laser beam from an outside of the case, when the current collecting tab is joined and fixed to an inner surface of a bottom portion of the case.

CITATION LIST

Patent Literature

PTL 1: Unexamined Japanese Patent Publication No. 2006-012787

SUMMARY OF THE INVENTION

Technical Problem

However, when a negative electrode lead is joined to a case by welding as in PTL 1, it is required to perform welding without penetrating the negative electrode lead. This is because, when the negative electrode lead is welded to the case, a melted portion penetrating the negative electrode lead, there is a risk that a spatter occurs from an upper surface of a melted section of the negative electrode lead. Then, when this conductive spatter is mixed in the electrode assembly, there is a risk of causing a short circuit, so that there is a possibility that reliability of a battery is lowered. On the other hand, when the negative electrode lead and the case are welded, the melted portion not penetrating the negative electrode lead, it is required to strictly control output of a laser and to perform the welding within a limited application range of the output of the laser, and thus there is a possibility that productivity is lowered.

Therefore, an object of a battery and a manufacturing method for the battery of the present disclosure is to provide a battery having higher reliability and excellent workability.

Solution to Problem

A first aspect of the present disclosure relates to a method for manufacturing a battery. The method includes: preparing a case having an opening at one end portion of the case and a bottom portion at another end portion of the case; preparing an electrode group including a first electrode, a second electrode, and a current collecting lead electrically connected to the first electrode; housing the electrode group in the case; and joining the current collecting lead to an inner surface of the case. The joining of the current collecting lead includes: pressing a pressing device having a tubular shape against the current collecting lead to cause the current collecting lead to contact the inner surface of the case; and welding the current collecting lead to the case while an inside of a tube of the pressing device is sucked by a suction device.

A second aspect according to the present disclosure relates to a battery The battery includes: an electrode group including a first electrode and a second electrode; a case housing the electrode group therein, the case having an opening at one end portion of the case and a bottom portion at another end portion of the case; and a current collecting lead electrically connected to the first electrode and electrically connected to an inner surface of the case. The current collecting lead has a melting trace joined to the inner surface of the case. The melting trace is formed on a first surface of the current collecting lead facing the case and on a second surface of the current collecting lead opposite to the first surface of the current collecting lead.

Advantageous Effect of Invention

According to the aspects of the present disclosure, when the case and the current collecting lead are laser-welded, a plume and/or spatter generated by melting of the current collecting lead is reduced, so that a highly reliable battery can be manufactured by an inexpensive and simple method.

BRIEF DESCRIPTION OF DRAWINGS

FIG. 3 is an enlarged cross-sectional view of a portion surrounded by a broken line ellipse indicated in FIG. 2.

DESCRIPTION OF EMBODIMENT

Figure 1:
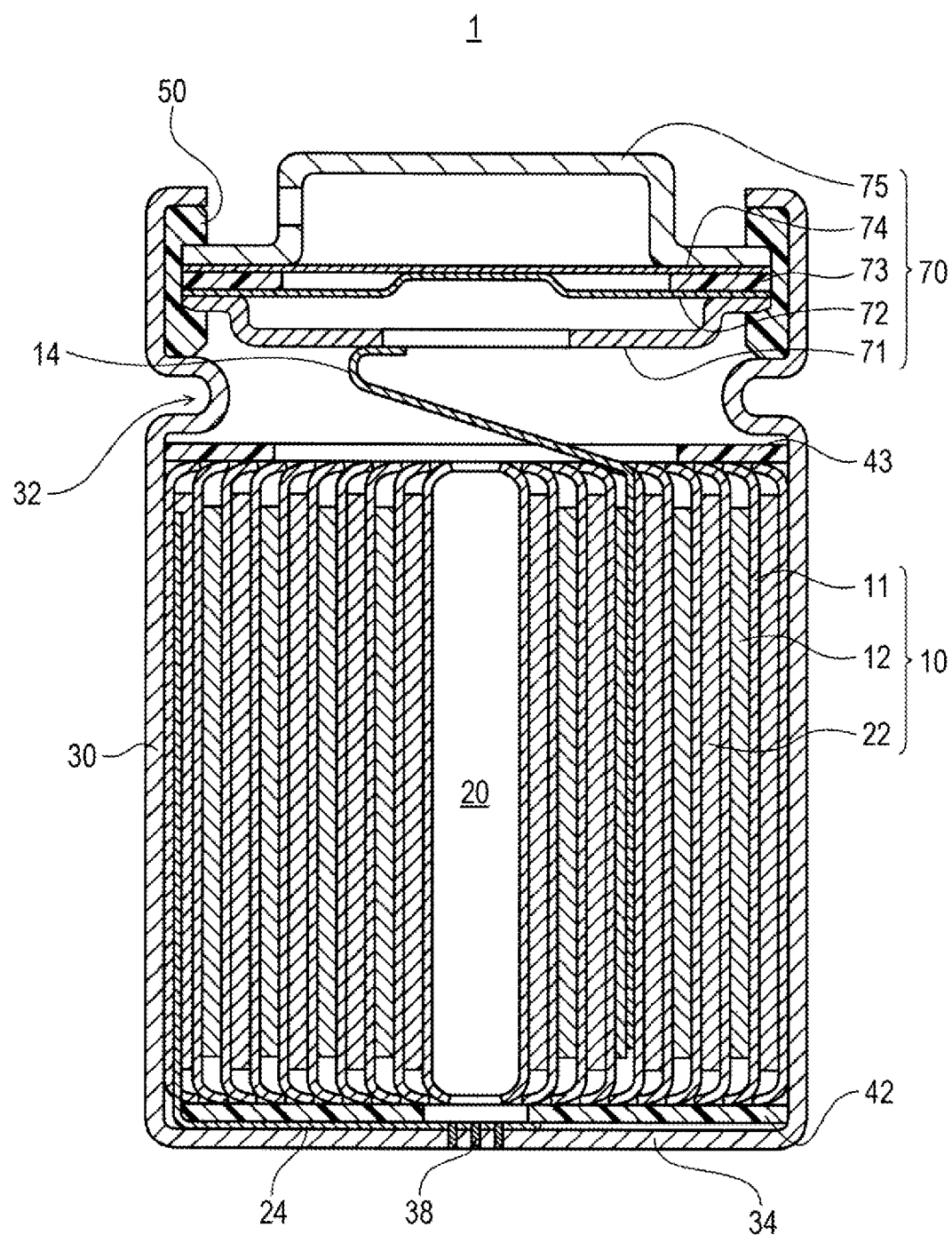
FIG. 1 is a front cross-sectional view of a battery according to the present exemplary embodiment as viewed from a vertical plane.

An exemplary embodiment of a battery and a manufacturing method for a battery according to the present disclosure will be described below with reference to the accompanying drawings. In the description of the exemplary embodiment, terms representing directions (e.g., "vertical", "horizontal", "right and left", and the like) are appropriately used for easy understanding, but these terms are used for describing directions in the drawings, and do not limit the present disclosure. In each of the drawings, in order to clarify a shape or characteristics of each component of the battery, dimensions of each of the components are shown as relative dimensions and are not necessarily shown in a same scale ratio. In the drawings, the same components are denoted by the same reference traces.

First, after a configuration of battery 1 will be described, a manufacturing method for battery 1 according to the present exemplary embodiment and a specific configuration of battery 1 obtained by the manufacturing method for battery 1 will be described below. The manufacturing method for the battery and the battery of the present invention are not limited to the configuration and the method of the following exemplary embodiment.

Configuration of Battery

FIG. 1 is a front cross-sectional view of battery 1 according to the present exemplary embodiment. Battery 1 shown in FIG. 1 includes electrode group 10, case 30 housing electrode group 10 therein, and sealing body 70 closing an opening portion of case 30. Electrode group 10 includes, for example, a winding-type structure where first electrode 12 and second electrode 22 are wound with separator 11 provided between the electrodes. That is, battery 1 is a so-called cylindrical battery. While in the present exemplary embodiment, a cylindrical battery is exemplified, application of the present invention is not limited thereto. Next, each component will be described below.

Electrode Group

Electrode group 10 is formed as a columnar body having a hollow 20 extended in a winding axis direction by winding first and second electrodes 12, 22 around a winding core (not shown) with separator 11 between the electrodes, and then removing the winding core. First electrode 12 may include a first current collector sheet and a first active material layer formed on a surface of the first current collector sheet (both are not shown). On the other hand, second electrode 22 may include a second current collector sheet and a second active material layer formed on a surface of the second current collector sheet (both are not shown).

First electrode 12 is electrically connected to sealing body 70 having conductivity through first lead 14 made of conductive foil. On the other hand, second electrode 22 is electrically connected to an inner surface of case 30 through second lead 24 similarly made of conductive foil.

While in the present exemplary embodiment, the inner surface of case 30 is a central portion of an inner surface of bottom portion 34 of case 30, the present invention is not limited thereto, and may be a side peripheral surface of case 30, or may be a part of bottom portion 34 other than a center (e.g., bottom surface biased to the peripheral side surface) as long as case 30 is electrically connected to second lead 24.

According to the present exemplary embodiment, the above-described electrical connection is achieved by laser-welding second lead 24 to case 30. Second lead 24 has melting traces 38 resulting from laser-welding case 30. Melting traces 38 of second lead 24 may overlap hollow 20 of electrode group 10 in the winding axis direction.

Second lead 24 has first surface 24a facing downward and second surface 24b opposite to first surface 24a, of which detail will be described later. Second surface 24b faces upward. Second lead 24 is welded to case 30 such that first surface 24a faces the bottom portion of case 30. In addition, melting traces 38 includes first melting traces 38a and second melting traces 38b formed by laser-welding on first surface 24a and second surface 24b of second lead 24. The area of each of first melting traces 38a is larger than the area of each of second melting traces 38b (FIG. 4).

In battery 1 configured as described above, sealing body 70 functions as a first terminal (e.g., positive electrode terminal) of battery 1, and case 30 functions as a second terminal (e.g., negative electrode terminal) of battery 1. Here, components in a case where first and second electrodes 12 and 22 are positive electrode 12 and negative electrode 22, respectively, will be detail below.

Positive electrode 12 includes a positive electrode current collector sheet and positive electrode active material layers formed on both surfaces of the positive electrode current collector sheet (not shown). In the case that battery 1 is a lithium ion battery, a metal foil of, for example, aluminum, an aluminum alloy, or the like is used as the positive electrode current collector sheet, and a thickness of the metal foil may range, for example, from 10 μm to 20 μm, but is not limited thereto.

Each of the positive electrode active material layers contains, for example, positive electrode active material, binder, and conductive agent. As the positive electrode active material of a lithium ion secondary battery, a lithium-containing composite oxide is preferable, and for example, $LiCoO_2$, $LiNiO_2$, or $LiMn_2O_4$ is used. As the positive electrode active material of a lithium ion primary battery, manganese dioxide or graphite fluoride is used. The thickness of the positive electrode active material layer may range, for example, from 70 μm to 130 μm, but is not limited thereto.

Positive electrode lead 14 of the lithium ion secondary battery may be made of, for example, material, such as aluminum, an aluminum alloy, nickel, a nickel alloy, iron, or stainless steel. The thickness of positive electrode lead 14 may range, for example, from 10 μm to 120 μm. Positive electrode lead 14 is connected to a bottom surface of sealing body 70 serving also as the positive electrode terminal.

Negative electrode 22 includes a negative electrode current collector sheet and negative electrode active material layers formed on both surfaces of the negative electrode current collector sheet (not shown). In the case that the battery is a lithium ion battery, metal foil, such as stainless steel, nickel, copper, or a copper alloy, is used as the negative electrode current collector sheet. The thickness of the negative electrode current collector sheet may range, for example, from 5 μm to 20 μm, but is not limited thereto.

Each of the negative electrode active material layers contains, for example, negative electrode active material, binder, and conductive agent. As the negative electrode active material of a lithium ion battery, metal lithium, alloy (silicon alloy, tin alloy, etc.), carbon material (graphite, hard carbon, etc.), silicon compound, tin compound, or lithium titanate may be used. The thickness of the negative electrode active material layer may range, for example, from 70 μm to 150 μm, but is not limited thereto.

Negative electrode lead 24 of the lithium ion battery is made of, for example, material, such as nickel, nickel alloy, iron, stainless steel, copper, or copper alloy. The thickness of negative electrode lead 24 may range, for example, from 10 μm to 200 μm. The width of negative electrode lead 24 is not particularly limited as long as negative electrode lead 24 is housed in case 30. The width of negative electrode lead 24 may range, for example, from 2 mm to 5 mm. In addition, negative electrode lead 24 may have a single-layer structure made of one kind of metal, or may have a multilayer structure with layers made of different metals. As this multilayer structure, for example, a two-layer structure composed of a Cu layer and a Ni layer, a three-layer structure composed of a Ni layer, a Cu layer, and a Ni layer, and the like are cited. The number of negative electrode leads 24 may not necessarily be for battery 1. For example, plural negative electrode leads 24 may be provided. Each of plural negative electrode leads 24 may be individually joined to bottom portion 34 of case 30, or tip portions of the plural leads 24 may overlap one another, and this overlapped portion may be joined to one portion of bottom portion 34 of case 30.

Separator 11 between positive electrode 12 and negative electrode 22 is made of insulating microporous thin film, woven fabric, or nonwoven fabric. The separator of the lithium ion battery may be made of, for example, polyolefin, such as polypropylene or polyethylene. The thickness of the separator may range preferably from 10 µm to 50 µm, and more preferably from 10 µm to 30 µm.

Electrolytic Solution

Electrolytic solution is made of, for example, lithium salt and nonaqueous solvent that dissolves the lithium salt. As the nonaqueous solvent, cyclic carbonate ester, chain carbonate ester, or cyclic carboxylate ester may be used. As the lithium salt, for example, $LiPF_6$ or $LiBF_4$ may be used, but the nonaqueous solvent and the lithium salt are not limited thereto.

Case

Case 30 shown in FIG. 1 has a cylindrical shape, has an opening in one end portion of the case, and has bottom portion 34 in another end portion of the case. Bottom portion 34 is closed. Groove 32 having an annular shape is formed near the end portion forming the opening of case 30. Case 30 may have an elliptic tubular shape besides the cylindrical shape as long as case 30 has a tubular shape. In addition, case 30 is made of a material having conductivity, and is made of, for example, stainless steel having a thickness ranging from 0.1 mm to 1.0 mm, but is not limited thereto. Lower insulating plate 42 may be interposed between bottom portion 34 of case 30 and electrode group 10. Upper insulating plate 43 may be further provided between a portion above electrode group 10 and case 30.

Sealing Body

Sealing body 70 may be formed by, for example, overlapping plural members. Sealing body 70 may include filter 71, lower valve body 72, insulating ring 73, upper valve body 74, and cap 75 which are placed on one another in this order from below. Specifically, a peripheral edge portion of filter 71 is joined to a peripheral edge portion of lower valve body 72. A central portion of lower valve body 72 is joined to a central portion of upper valve body 74. Insulating ring 73 is interposed between the peripheral edge portion of lower valve body 72 and a peripheral edge portion of upper valve body 74. The peripheral edge portion of upper valve body 74 is joined to a peripheral edge portion of cap 75. Lower valve body 72 and upper valve body 74 function as a safety mechanism of battery 1. When an internal pressure of case 30 increases, lower valve body 72 is broken. When upper valve body 74 is pushed upward by gas, a joined portion between lower valve body 72 and upper valve body 74 is broken, thereby cutting off electrical connection between upper valve body 74 to lower valve body 72. When the internal pressure of case 30 further increases, upper valve body 74 is broken, and the gas in case 30 passes through an inside of cap 75 and is released to an outside of battery 1. Gasket 50 having insulation may be interposed between sealing body 70 and the opening portion of case 30. Gasket 50 has functions of insulating between sealing body 70 and case 30, and sealing the opening portion of case 30 together with sealing body 70.

Manufacturing Method for Battery

A method for manufacturing a battery according to the present exemplary embodiment will be described below.

First, electrode group 10 described above is prepared. In case 30, positive electrode lead 14 is extended toward the opening of case 30, and negative electrode lead 24 is extended toward bottom portion 34 of case 30. Further, a process of bending a portion of negative electrode lead 24 extended to bottom portion 34 of case 30 beyond electrode group 10, and making negative electrode lead 24 substantially parallel to an inner surface of the bottom portion is performed. Further, lower insulating plate 42 having a ring hole with a hole at a center thereof is interposed between electrode group 10 and bottom portion 34 of case 30, and electrode group 10 is inserted into case 30 through the opening.

Figure 2:
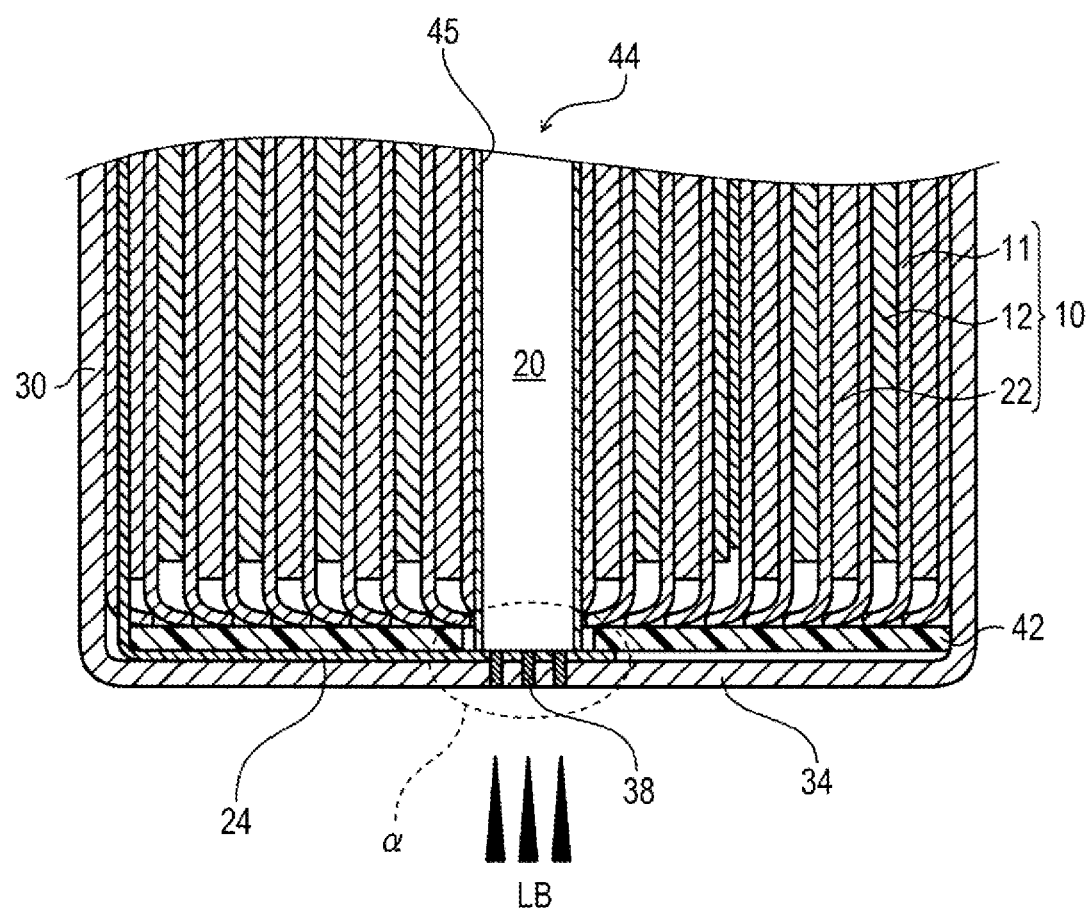
FIG. 2 is an enlarged front cross-sectional view similar to FIG. 1 in a step of laser-welding a negative electrode lead to a case.

FIG. 2 is an enlarged front cross-sectional view similar to FIG. 1 in a step of laser-welding negative electrode lead 24 to bottom portion 34 of case 30. As described above, a position where negative electrode lead 24 is laser-welded to case 30 is not limited to a central position of bottom portion 34 of case 30 as shown in the drawing, and may be a peripheral side surface or a bottom surface adjacent to the peripheral side surface.

Next, pressing device 44 having a tubular shape is prepared. Pressing device 44 may be a conduit made of, for example, stainless steel. Then, pressing device 44 is inserted into the hollow portion of electrode group 10 disposed inside case 30. An outer diameter of pressing device 44 having a tubular shape may be, for example, equal to or larger than 2 mm and equal to or smaller than 4 mm. The inner diameter of pressing device 44 may be, for example, equal to or larger than 1.5 mm and equal to or smaller than 3 mm. In FIG. 2, pressing device 44 having the tubular shape is exaggeratedly illustrated larger than an actual size in order to facilitate understanding of the features of pressing device 44.

Pressing device 44 having the tubular shape is connected to a suction device (not shown), such as a pressure reducing pump, and is configured to suck a fluid together with spatter P from tube 45 of pressing device 44 in accordance with operation of the pressure reducing pump. A suction pressure of tube 45 by the suction device may be, for example, 50 kPa or more, and may be, for example, 70 kPa or more.

Pressing device 44 presses negative electrode lead 24 toward case 30 to cause negative electrode lead 24 to contact (the inner surface of) case 30. While the above-described insertion operation and pressing operation of pressing device 44 may be manually performed by an operator, they may be automatically performed with a manipulator driven by a step motor (both are not shown).

After pressing device 44 is pressed against negative electrode lead 24 to cause negative electrode lead 24 contact (the inner surface of) case 30, case 30 is laser-welded to negative electrode lead 24 by irradiating bottom portion 34 of case 30 with laser beam LB from a laser output part.

FIG. 3 is an enlarged cross-sectional view of a portion surrounded by broken line ellipse a shown in FIG. 2. In the present disclosure, a region or a portion of case 30 facing negative electrode lead 24 and irradiated with laser beam LB is referred to as a facing portion. In the present application, regions or portions of first surface 24a and second surface 24b of negative electrode lead 24 where melts (including a melt having continuity and integrity) made of constituent materials of case 30 and negative electrode lead 24 are formed, and that are recognized in appearance to have been melted are referred to as melting traces 38a and 38b.

Laser beam LB may be a continuous oscillation laser beam or a pulsed laser beam. The laser output part is not particularly limited in terms of a laser oscillation mechanism of the laser output part, but preferably is a laser oscillator with a fiber laser. Further, for case 30, laser beam LB is preferably applied to plural (three in FIGS. 2 and 3) positions in the facing portion on bottom portion 34.

In order to connect case 30 to negative electrode lead 24 with a small electric resistance, an outer surface of the bottom portion of case 30 is irradiated with laser beam LB having appropriate light intensity in order to continuously and integrally form the melting traces made of the constituent materials of both case 30 and negative electrode lead 24. However, as described above, the thickness of case 30 ranges, for example, from 0.1 mm to 1.0 mm. On the other hand, the thickness of negative electrode lead 24 ranges, for example, from 10 μm to 200 μm, so that negative electrode lead 24 is often thinner than case 30. Therefore, it is not easy to perform the laser welding while maintaining the appropriate light intensity of laser beam LB. In particular, when the light intensity of laser beam LB is smaller than the appropriate intensity, the electric resistance between case 30 and negative electrode lead 24 increases, and characteristics of battery 1 are significantly impaired accordingly. On the other hand, when the light intensity of laser beam LB is extremely larger than the appropriate intensity, a hole penetrating case 30 and negative electrode lead 24 may be formed, accordingly increasing a risk reducing bonding strength and mechanical strength.

In addition, the light intensity of laser beam LB is high, and spatter P made of a plume and/or spatter may be formed from second surface 24b of negative electrode lead 24 although a through-hole is not formed. Since spatter P has conductivity, spatter P may move inside battery 1 filled with the electrolytic solution to cause a leakage current between positive electrode 12 and negative electrode 22 or a short circuit between positive electrode 12 and negative electrode 22.

Therefore, the method for manufacturing battery 1 according to the present exemplary embodiment includes a step of discharging air inside tube 45 of pressing device 44 with the pressure reducing pump. As a result, the plume and/or spatter generated from second surface 24b of negative electrode lead 24 accompanying the laser welding can be reduced from an inside of battery 1, and the leakage current/short circuit between positive electrode 12 and negative electrode 22 can be prevented.

After negative electrode lead 24 is welded to case 30, upper insulating plate 43 is disposed above electrode group 10. Positive electrode lead 14 is then inserted into a hole formed in upper insulating plate 43. Positive electrode lead 14 passing through upper insulating plate 43 is led out from the opening of case 30, and welded to filter 71 of sealing body 70 disposed inside gasket 50. The electrolytic solution is injected into case 30 by a pressure reduction method. Groove 32 having an annular shape is then formed in a side wall of case 30. Finally, sealing body 70 is disposed on an inner surface of groove 32 together with gasket 50, and the end portion of case 30 is caulked to a peripheral edge portion of sealing body 70 with gasket 50 interposed therebetween, thereby manufacturing battery 1 having a cylindrical shape.

Negative Electrode Lead

Figure 4A:
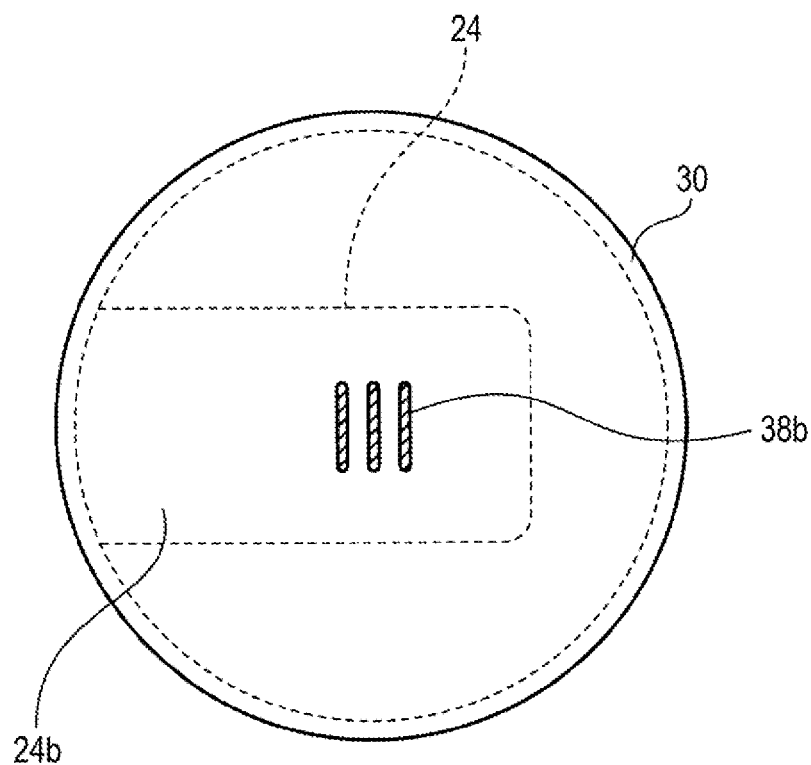
FIG. 4(a) is a plan view showing a second surface of the negative electrode lead.
Figure 4B:
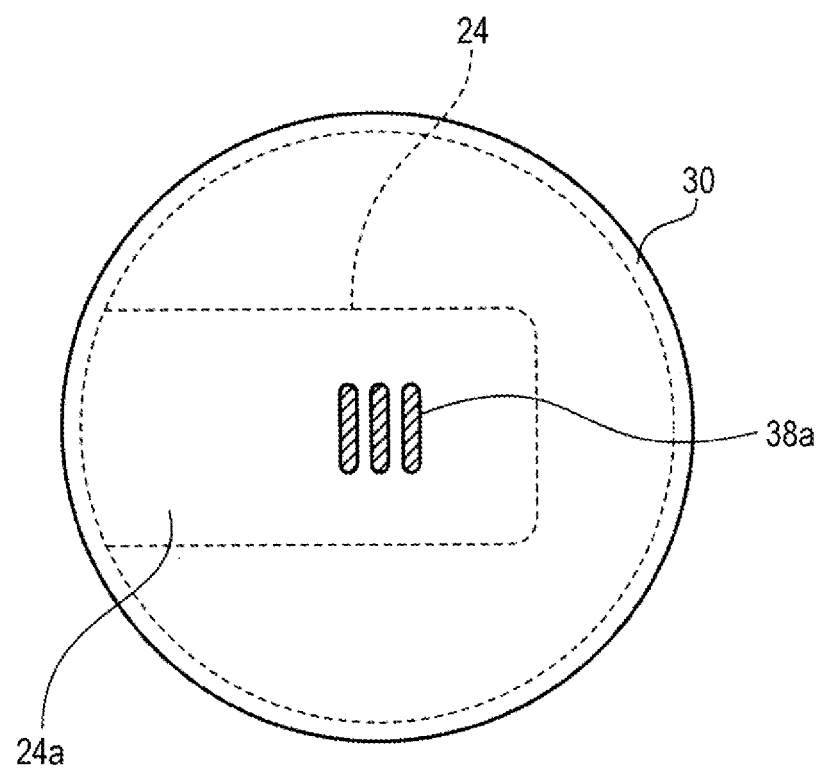
FIG. 4(b) is a bottom view showing a first surface of the negative electrode lead.

FIG. 4(a) is a plan view showing second surface 24b of negative electrode lead 24, and FIG. 4(b) is a bottom view showing first surface 24a of negative electrode lead 24. FIGS. 4(a) and 4(b) show plural melting traces 38 made of melts made of constituent materials of case 30 and negative electrode lead 24 by irradiation with laser beam LB. In FIGS. 4(a) and 4(b), outlines of a part of the constituent members appearing in the drawing are indicated by broken lines to emphasize shapes of melting traces 38 in the drawing.

As shown in the drawing, the area of each of melting traces 38b (also referred to as a second melting trace) formed on second surface 24b of negative electrode lead 24 is smaller than the area of each of melting traces 38a (also referred to as a first melting trace) formed on first surface 24a. In addition, the plural melting traces 38 may be extended linearly and are apart from one another on first surface 24a and second surface 24b. Melting traces 38b formed on second surface 24b of negative electrode lead 24, it is possible to check a melting state of negative electrode lead 24 and a joining state between negative electrode lead 24 and case 30 by virtually checking whether or not the melting trace 38b is present on second surface 24b. Conventionally, the melting state and the joining state have not been seen due to being covered with case 30. Therefore, it is possible to simplify an inspection step of checking the present joining state.

The shape of melting trace 38 may not be extended linearly as described above. For example, melting traces 38 may be formed on first surface 24a and second surface 24b as plural dots (spot shapes). Further, as shown in FIGS. 4(a) and 4(b), a direction in which the linearly extending melting trace 38 is extended may not be a direction perpendicular to a direction in which negative electrode lead 24 extended substantially in parallel with bottom portion 34 of case 30 is extended.

Figure 5A:
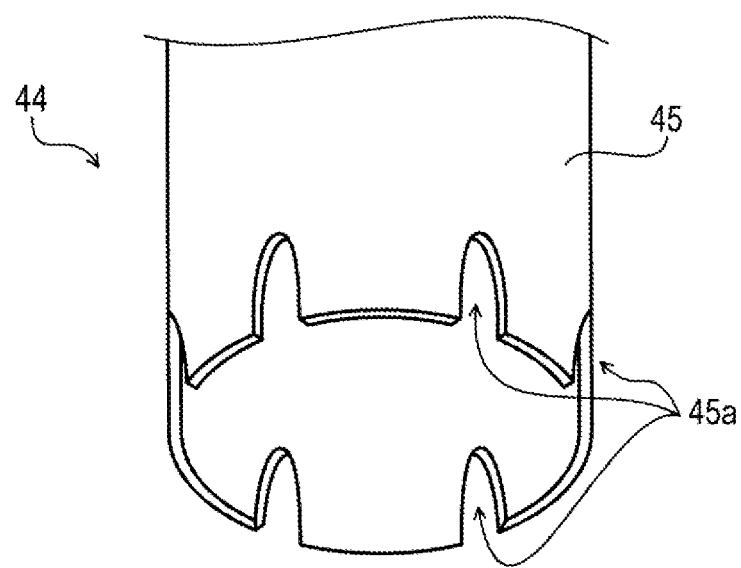
FIGS. 5(a) to 5(c) are a bottom perspective view, a cross-sectional view seen from a vertical plane, and a bottom view each showing a part of a pressing device according to a modification of the present exemplary embodiment in an enlarged manner.
Figure 5B:
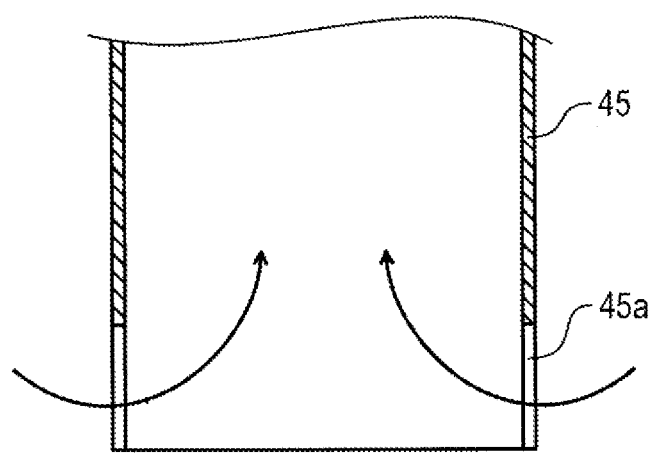
Figure 5C:
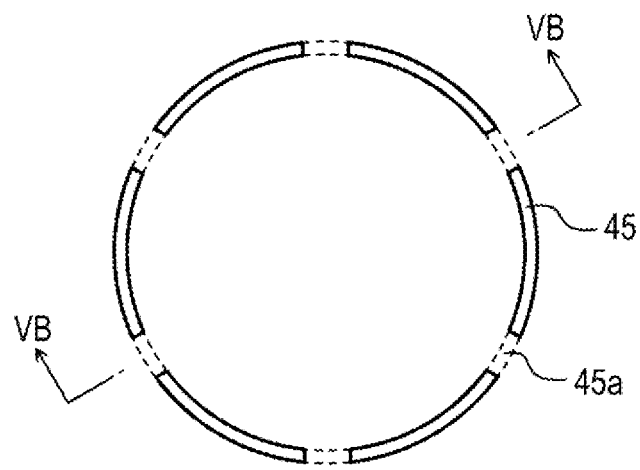

FIG. 5(a) is a bottom perspective view showing a part of pressing device 44 according to a modification of the present exemplary embodiment in an enlarged manner. FIG. 5(b) is a front cross-sectional view showing a part of pressing device 44 according to the modification in an enlarged manner. FIG. 5(c) is a bottom view of pressing device 44 according to the modification. FIG. 5(b) is a front cross-sectional view taken along line VB-VB in FIG. 5(c). As shown in FIG. 5, cutouts 45a may be formed in a front end of tube 45. This configuration prevents an inside of tube 45 from being blocked by negative electrode lead 24 when pressing device 44 contacts negative electrode lead 24, and an inside of the tube of pressing device 44 is sucked. Therefore, since a flow of gas flowing into tube 45 of pressing device 44 from the inside of case 30 through cutouts 45a is generated, an airflow is easily generated in the tube of pressing device 44. Therefore, the spatter or the like are easily sucked. The inner diameter of tube 45 may be larger than the width of negative electrode lead 24. This configuration restrains the inside of tube 45 of pressing device 44 from being sealed by negative electrode lead 24.

Manufacturing System

Figure 6:
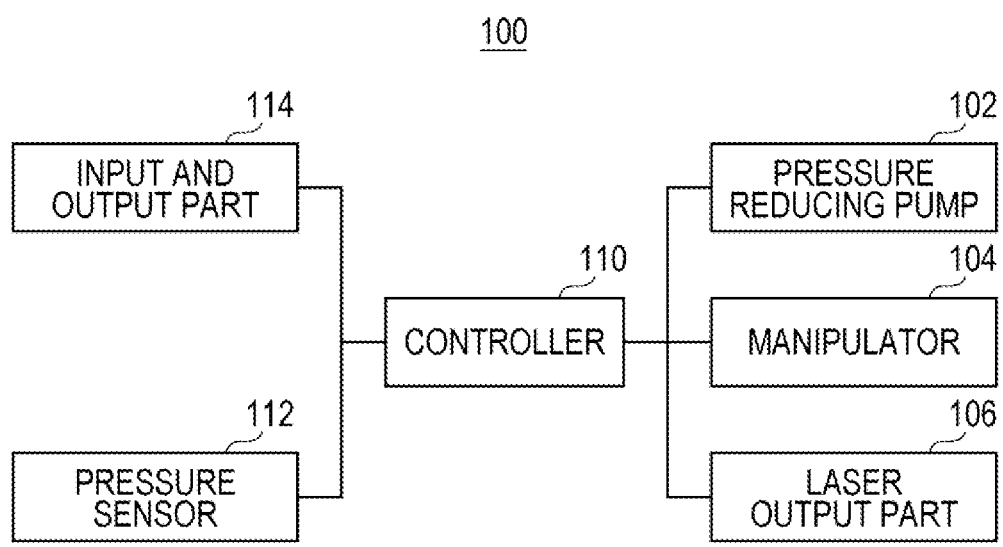
FIG. 6 is a block diagram showing a configuration of a manufacturing system that executes a manufacturing method for the battery according to the present exemplary embodiment.

The manufacturing method according to the present exemplary embodiment is preferably performed in-line (automatically). FIG. 6 is a block diagram showing a configuration of manufacturing system 100 configured to execute the method for manufacturing the battery according to the present disclosure. As described above, manufacturing system 100 includes pressure reducing pump 102, manipulator 104, and laser output part 106. Pressure reducing pump 102 is configured to discharge the air in tube 45 of pressing device 44. Manipulator 104 is configured to drive insertion operation of pressing device 44 into hollow 20 and pressing operation against negative electrode lead 24. Laser output part 106 is configured to irradiate the bottom surface of case 30 with laser beam LB to laser-weld case 30 to negative electrode lead 24. Manufacturing system 100 further includes controller 110 configured to control operations of pressure reducing pump 102, manipulator 104, and laser output part 106. Manufacturing system 100 further includes pressure sensor 112 configured to monitor an air pressure inside tube 45 of pressing device 44, and input-output part 114 (machine interface). Input-output part 114 is configured to set the light intensity of laser beam LB output from laser output part 106 and a degree of pressure reduction (degree of vacuum) and a flow rate inside tube 45 of pressing device 44 during laser welding, and display the air pressure inside tube 45 sensed by pressure sensor 112.

The operator may set, through input-output part 114, a pressing force by which pressing device 44 presses negative electrode lead 24 downward during the pressing operation and the light intensity of laser beam LB output from laser output part 106 during the laser welding, and the degree of pressure reduction (degree of vacuum) and the flow rate inside tube 45 of pressing device 44.

Controller 110 of manufacturing system 100 controls manipulator 104 for pressing device 44 to press negative electrode lead 24 with the pressing force set by input-output part 114, controls laser output part 106 to output laser beam LB having the light intensity similarly set during the laser welding, and reduces the pressure inside tube 45 of pressing device 44 at a desired degree of pressure reduction.

As the laser welding progresses, a part of negative electrode lead 24 (a portion corresponding to melting trace 38) is melted, and the spatter or the like occurs inside tube 45 of pressing device 44. At this time, the degree of pressure reduction inside tube 45 decreases (the pressure increases). Pressure sensor 112 is configured to monitor the air pressure inside tube 45 of pressing device 44 and to feed the air pressure back to controller 110. Controller 110 is configured to control pressure reducing pump 102 to substantially stabilize the monitored pressure inside tube 45. Thus, the manufacturing method according to the present exemplary embodiment can be executed in-line.

INDUSTRIAL APPLICABILITY

The present disclosure can be used for a battery including a case and a lead laser-welded, and a manufacturing method for the battery.

REFERENCE MARKS IN THE DRAWINGS 1 battery
10 electrode group
11 separator
12 first electrode (positive electrode)
14 first lead (positive electrode lead)
20 hollow
22 second electrode (negative electrode)
24 second lead (negative electrode lead)
24a first surface
24b second surface
30 case
32 groove
34 bottom portion
38 melting trace
38a first melting trace
38b second melting trace
42 lower insulating plate
43 upper insulating plate
44 pressing device
45 tube
45a cutout
50 gasket
70 sealing body
71 filter
72 lower valve body
73 insulating ring
74 upper valve body
75 cap
100 manufacturing system
102 pressure reducing pump
104 manipulator
106 laser output part
110 controller
112 pressure sensor
114 input-output part (machine interface)
LB laser beam
P spatter

The invention claimed is:

1. A method for manufacturing a battery, comprising:
preparing a case having an opening at one end portion of the case and a bottom portion at another end portion of the case;
preparing an electrode group including a first electrode, a second electrode, and a current collecting lead electrically connected to the first electrode;
housing the electrode group in the case; and
joining the current collecting lead to an inner surface of the case, wherein
said joining the current collecting lead comprises:
pressing a pressing device having a tubular shape against the current collecting lead to cause the current collecting lead to contact the inner surface of the case; and
welding the current collecting lead to the case while an inside of a tube of the pressing device is sucked by a suction device,
the electrode group further includes a separator provided between the first electrode and the second electrode, the first electrode, the second electrode, and the separator being wound together about the winding axis direction to form a hollow extended in the winding axis direction, and
said joining the current collecting lead comprises:
pressing the current collecting lead with the pressing device while the pressing device is inserted into the hollow; and
welding the current collecting lead to the case.

2. The method according to claim 1, wherein said welding the current collecting lead comprises sucking a plume and/or a spatter generated by melting the current collecting lead when welding the current collecting lead to the case.

3. The method according to claim 1, wherein the inner surface of the case has a facing portion facing the current collecting lead, and
said welding the current collecting lead comprises welding the current collecting lead to the case by irradiating the facing portion with a laser beam from an outside of the case.

4. The method according to claim 1, further comprising:
monitoring a pressure or a flow rate inside the tube of the pressing device; and
adjusting the pressure or the flow rate inside the pressing device so as to stabilize the monitored pressure or flow rate inside the tube shape of the pressing device.

5. The method according to claim 1, wherein
the current collecting lead has a first surface and a second surface opposite to the first surface, the first surface of the current collecting lead being configured to contact the case, and
said joining the current collecting lead further comprises melting the current collecting lead from the first surface to the second surface while welding the current collecting lead to the case.

6. The method according to claim 1, wherein:
said joining the current collecting lead comprises:
welding the case and the current collection lead inside the tube of the pressing device, viewed from the one end.

7. The method according to claim 1, wherein:
the pressing device having cutouts in a front end of the tube of the pressing device,
the front end of the pressing device contacting to the inner surface of the case.

8. The method according to claim 1, wherein:
laser welding the current collecting lead to the case and the current collecting electrically connected to the case.

\* \* \* \* \*